May 19, 1936.  H. C. DOANE  2,040,923
VEHICLE SIGNAL
Filed June 22, 1933   3 Sheets-Sheet 1

Inventor
Harry C. Doane
By Blackmore, Spencer & Fluck
Attorneys

May 19, 1936.   H. C. DOANE   2,040,923
VEHICLE SIGNAL
Filed June 22, 1933   3 Sheets-Sheet 2
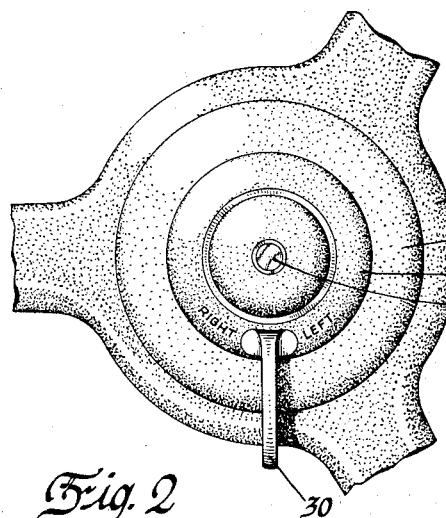
Fig. 2
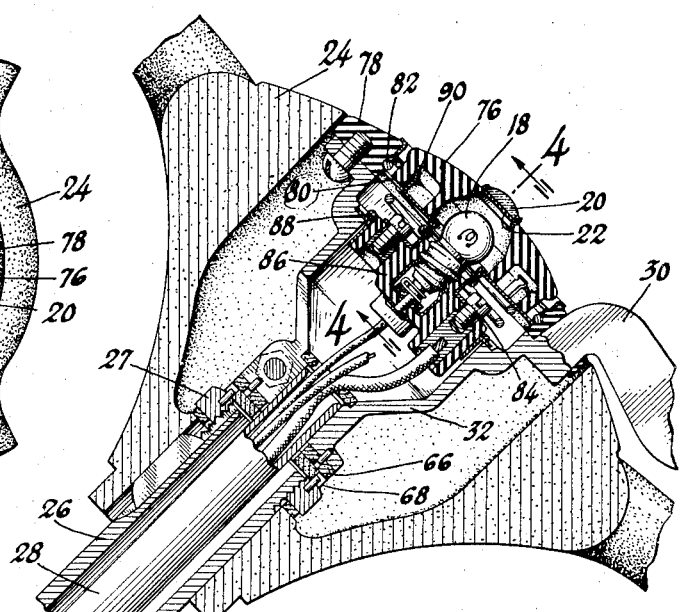
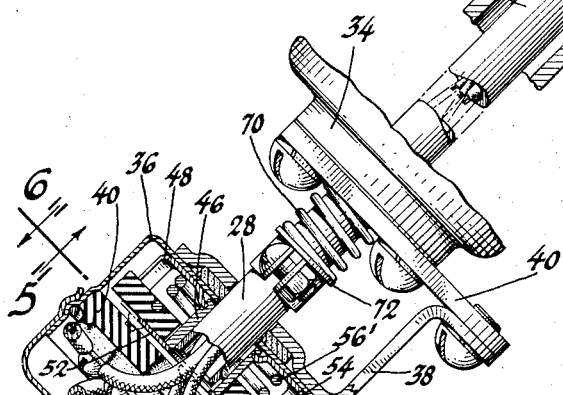
Fig. 3
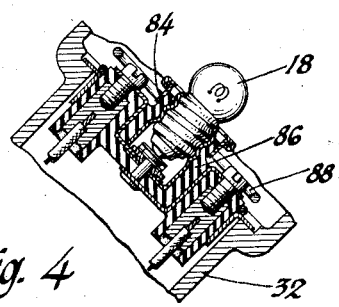
Fig. 4
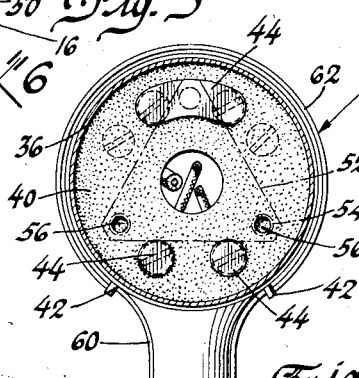
Fig. 6
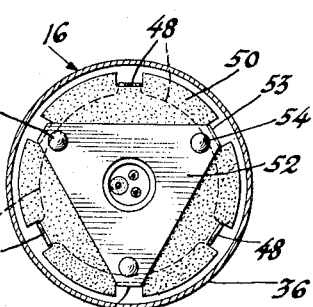
Fig. 5
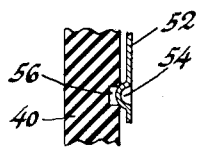
Fig. 7
Fig. 8
Inventor
Harry C. Doane
By Blackmore, Spencer & Flint
Attorneys May 19, 1936.  H. C. DOANE  2,040,923
VEHICLE SIGNAL
Filed June 22, 1933   3 Sheets-Sheet 3

Inventor
Harry C. Doane
By Blackmore, Spencer & Flint
Attorneys

Patented May 19, 1936

2,040,923

UNITED STATES PATENT OFFICE 2,040,923

VEHICLE SIGNAL

Harry C. Doane, Flint, Mich., assignor to General Motors Corporation, Detroit, Mich., a corporation of Delaware Application June 22, 1933, Serial No. 677,021

7 Claims. (Cl. 177—339)

This invention has to do with signal lights for use on automobiles especially of the type employed to indicate the direction in which the vehicle is to be turned.

It is very desirable that such signals be constructed so that the driver can manually turn them on to give an indication of the direction in which he is going to go so that the traffic following him may know his intention prior to making the turn. I have accordingly arranged my signalling system so that this may be most conveniently done by locating the direction signal switch in the steering column.

It is likewise desirable to make provision for automatic turning off of the signal when the turn has been completed so that the vehicle will not be giving out misleading indications of the driver's intentions. I have accordingly provided for automatic resetting of the signal by connecting the signal operating member to the steering shaft so that as the shaft is rotated to straighten out the wheels the signal is moved to off position. If preferred I may employ a thermostatically controlled resetting device instead of the mechanical design.

Since the driver of a car equipped with my system will rely upon his equipment giving the desired signal, it is essential that some safeguard be thrown about its operation so that if it is no longer operating because of a burnt out bulb or other defect, the driver will know of it. I have accomplished this by the provision of a pilot light, preferably mounted in the steering wheel hub, which is arranged in series with the signal light and gives an indication whenever the signal is turned on. The pilot light is preferably bridged about a resistance to cut down its brilliance and at the same time reduce as little as possible the voltage at the signal. If desired a plurality of signals may be connected to the resistance so that an indication of the same brightness is given whether two or four signal lamps be energized.

Figure 2 is a top plan view of a central portion of a steering wheel equipped with one form of direction signal control.

Figure 3 is a vertical section through the construction of Figure 2.

Figures 4, 5 and 6 are sections taken on the corresponding lines of Figure 3.

Figure 7 is a section through one of the stationary switch contacts for the direction signal.

Figure 8 is a section through the direction switch showing the arrangement for holding the signal in off position.

Figure 9 is a section corresponding to Figure 3 showing a modification.

Figure 10 is a section on line 10—10 of Figure 9.

Figures 11 and 12 are detail views showing parts of the switch of Figure 9.

Figure 13 is a bottom view of the connection to the stationary switch contacts at the bottom of the steering column.

Figure 1:
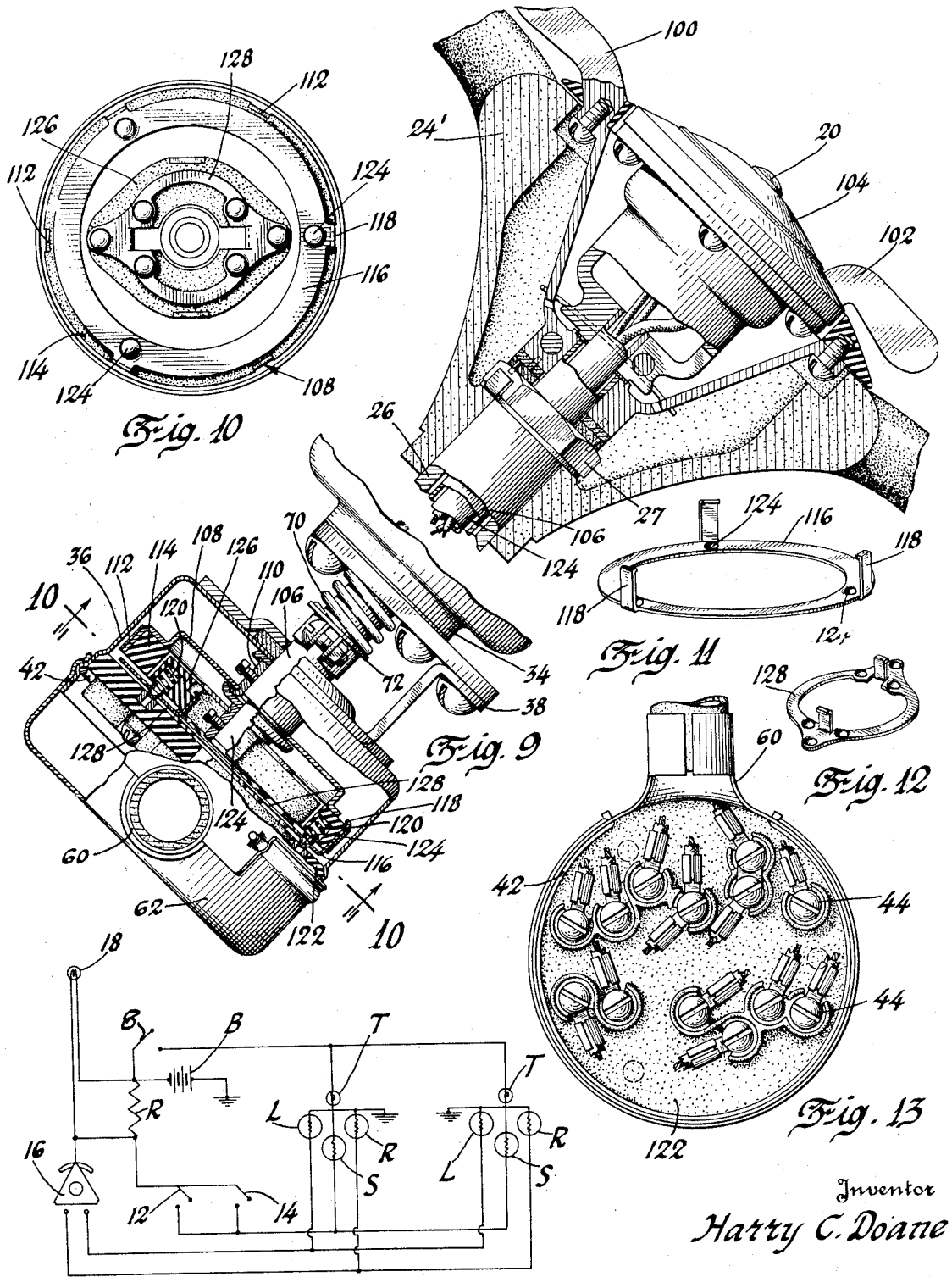
Figure 1 illustrates the preferred form of circuit in which my direction signal may be employed.

In the circuit shown in Figure 1, B indicates the battery which supplies current through the usual tail light switch 8 to the tail lights T. The battery B also supplies current through resistance R to the stop light, back-up light and direction signals. The lamp S serves both for the stop light and the back-up light and is independently controlled by stop light switch 12 and back-up light switch 14 in the usual manner. The supply of current to the lamps L of the left direction signal and the lamp R of the right direction signal is controlled by means of switch 16 operated from the steering column.

18 indicates a pilot lamp preferably mounted in the horn button assembly at the top of the steering column. It is lighted when either the stop light, the backing-up light or the direction signals are operated. Should any of the lamps fail, the driver is warned by reduction in the intensity of illumination of the lamp 18 or by its extinguishment. While the detail construction of the mounting of the lamp 18 will be given later, it should be noted that this lamp is intended to operate with standard 6 volt, 15 candle power bulb in the rear signal, whereas pilot lamps usually employed in a 6 volt circuit require the use of 3-volt bulbs in series which is objectionable from the standpoint of lack of standardization and the excessive size of the bulb to be mounted in the position shown. The bulb 18 consists of a standard 2.5 volt flashlight bulb operating at approximately 6 volts when either the direction or stop signals are applied independently; or at approximately 1.5 volts when stop and direction signals are applied simultaneously. This voltage is obtained by connecting the bulb 18 across the resistance R as shown. By operating the bulb considerably below rated voltage, its life is practically unlimited. The slight drop in voltage across the resistance necessary to operate the lamp 18 reduces only slightly the illumination of the rear signal. The reason for operating the lamp at considerably under its normal voltage is to produce only a very slight glow. The indication is obtained more from a change in color of the lens used with the pilot lamp than from the intensity of its light. The change in color is produced by using a lens 20 as shown in Figure 3, beneath which is inserted a thin red pyralin washer 22. Normally the lens is of a green color, but when the lamp 18 is lighted it turns red.

Should the direction signal and stop light operate simultaneously the voltage drop across the resistance increases because of the additional current thus increasing the brilliancy of the glow from the pilot lamp.

When either the direction signal or stop signal is operated, there is an instantaneous increase in illumination which is caused by the additional current required by the cold lamp filaments. This is known as "over-shooting." This characteristic is made use of in the pilot lamp to give additional brilliancy to the signal for a small fraction of a second as it is applied. The instantaneous flash thus provided attracts the attention of the driver without his looking directly at the pilot lamp and since it is of but short duration, does not annoy the driver.

I have preferably built the direction signal switch 16 into the steering assembly in the following manner: 24 indicates the steering wheel provided with an enlarged hub as shown. The steering wheel is keyed to the usual operating shaft 26, being held in place by lock nut 27. Within the shaft is mounted tubular shaft 28 to the upper end of which is clamped the operating lever 30 having a hollow hub 32. The shaft 28 projects as usual through the bottom of the housing 34 of the steering gear and into housing 36 supported by bracket 38 from the end plate 40 of the housing 34. Within the housing 36 is mounted the switch 16. The switch consists of a plate 40 of insulating material fixed within the open end of the housing and held in place by snap ring 42. The plate 40 carries terminals 44 connected to wires going to the signals.

The movable member of the switch consists of a short sleeve 46 keyed to the lower end of the shaft 28 and having secured to it a stamping 48 provided with down-turned fingers received in notches in plate 50 slidably mounted on the member 46. Plate 50 carries the switch contact plate 52 having up-turned fingers 53 received in another set of notches in plate 50. The plate 52 is likewise provided with pressed-out contact portions 54 adapted to engage the fixed contacts 44. The portions 54 are normally received in depressions 56 formed in plate 40. These depressions are located as in the off position of the switch. Spring 56 yieldingly urges the plate 50 and switch plate 52 toward the plate 40.

The wires going to the various terminals on plate 40 are conducted to the interior of the housing 36 through tubular extension 60 which may be formed as a part of the housing 36 or may be separately formed and secured thereto. Over the bottom of the housing 36 I have provided a removable cap 62 in order to keep the assembly clean.

With the arrangement as so far described the direction signal switch may be operated by simply turning the lever 30 either to right or to left to give the desired indication.

It is desirable to provide for automatic return of the signal to off position when the steering wheel is straightened out and I have accomplished this by providing a friction clutch connection between the rotatable steering shaft 26 and the tube 28 which operates the direction signal switch. This clutch may take the form of a friction washer 66 of leather or other suitable material secured by means of pins to the hub 32 so as to rotate therewith and friction washer 68 similarly secured to the nut 27 which turns with the steering shaft. The friction washers 66 and 68 are yieldingly pressed together by means of spring 70 located between plate 40 on the steering gear housing and collar 72 clamped to the shaft 28.

The friction between the washers 66 and 68 is sufficient to return shaft 28 and the movable switch member to off position when the steering gear is straightened but is insufficient to disengage the contact points 54 from the recesses 56, these parts being in engagement when the direction signal switch is in off position.

It is usual to mount the horn button 76 in the hub of the steering wheel but I have modified the construction somewhat so as to receive the pilot lamp 18. A ring 78 preferably made of bakelite or other material is secured to the hub 32. In the interior of the ring 78 is slidably fitted the movable contact 80 of the horn button switch, the contact being held in place by means of split ring 82 snapped within a groove in the ring 78. The fixed horn button contact member 84 is in the form of a disc secured to insulator 86 provided with suitable terminals for connection with the wires of the horn circuit. The coil spring 88 tends to separate the movable contact member 80 from the fixed contact member 84. The horn button 76 is removably secured to the plate 80 by means of spring fingers 90 to make the bulb 18 accessible for replacement. The member 76 is centrally apertured to receive the lens 20 and pyralin ring 22 previously described and the horn contact members 80 and 84 are apertured as shown to permit passage of the pilot lamp. As is more clearly shown in Figure 4, insulator 86 is provided with a socket to receive the bulb 18 and with suitable contacts for supplying current to the lamp socket. The wires supplying current to the pilot lamp 18 as well as those leading to the horn button switch pass down through the tube 28 and are secured to suitable terminals on the base 40 where they are adapted for connection to the wiring harness passing through sleeve 60.

In Figures 9 to 13 I have shown a modified form of direction signal switch. Here the steering wheel 24' is provided with a somewhat larger recess so that it may receive two concentric operating members, the member 100 actuating the direction signal switch, and the member 102 operating the lighting switch. Member 102 contains within its hollow hub the horn button 104 equipped with the pilot light and lens as previously described. The steering wheel 24' is mounted upon steering shaft 26 in the manner previously described. The operating member 100 is secured to shaft 106 within the shaft 26. To the lower end of shaft 106 is secured spider 108 by means of collar 110. Spider 108 has down-turned arms 112 engaging the notches in annular insulating member 114. Member 114 carries switch contact ring 116 having up-turned arms 118 engaging in notches in the ring 114. Coil springs 120 press the contact ring 116 toward the fixed contact carrying member 122. This member is provided with depressions to receive projections 124 on the ring when the switch member is in off position as in the case of the form first described and is likewise provided with terminals of the type shown at 44 in Figure 7 connected to the direction signals.

The direction signal switch shown in Figure 9 operates the same as that shown in the previous figures.

The operating lever 102 is secured to hollow shaft 124 to the lower end of which is secured insulator 126 carrying lighting switch contact ring 128 which may control the various lighting circuits in known manner through cooperation with fixed contacts on member 122.

While I prefer the friction arrangement described for returning the signal to off position, I may, if preferred, use a timing element for this purpose. I have shown such an arrangement in Figures 14 and 15. As best shown in Figure 15, the direction signal switch consists of a lever 170 equipped with a wire or blade spring 172 having its ends guided in fittings secured to the plate 174. The spring 172 normally holds the switch in off position. When the switch is moved to operate either signal, detent 176, in the form of a return bent bimetallic thermostatic element, engages in a notch 178 formed in the lever 170 to hold the switch engaged. The member 176 is made of U-shape in order to compensate for outside temperature variation. Current is supplied to the switch through contact 180, heating coil 182 surrounding a portion of the thermostatic element 176, and lead 184 going to the contact on switch member 170. By this means the current going to the direction signals passes through heating coil 182 and when the coil sufficiently heats the member 176, the end of the latter is withdrawn from notch 178 permitting the spring 172 to move the switch 170 to off position. This construction may be so designed as to hold the direction signal switch engaged for some predetermined length of time. Of course, such a construction will possess disadvantages in that for example, when awaiting changing of lights at an intersection, the thermostatic control may throw the switch out at a time when it should indicate a turn.

Figure 14:
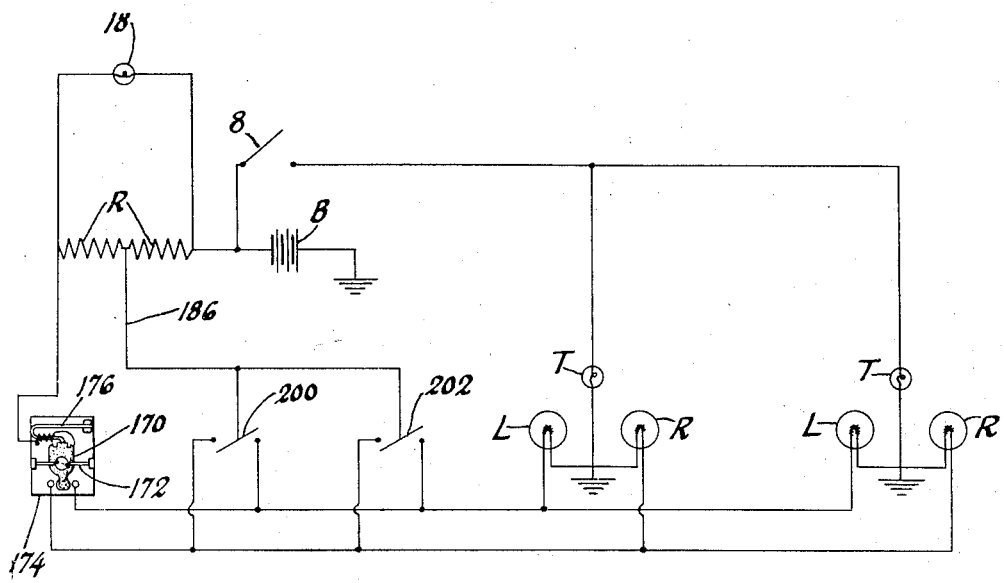
Figure 14 shows a modified form of circuit including a thermostatically controlled switch.
Figure 15:
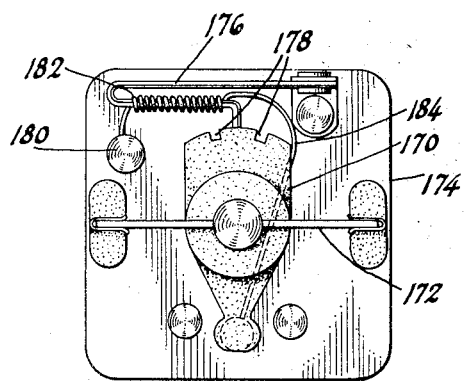
Figure 15 is a view showing the details of the switch of Figure 14.

In Figure 14 I have shown a modification of the circuit. In this modification the direction signal bulbs also serve as stop lights and back-up lights. When so used both are energized, this being done by means of stop light switch 200 or back-up switch 202, both of which are arranged to close the circuits to both direction signal lamps.

In this arrangement also the lead 186 going to the stop light and back-up light is connected to an intermediate point on the resistance R. The result of this is to give the pilot light 18 the same degree of intensity when the two direction signals are burning, as when four lamps are burning at the rear of the car. This is due to the fact that when the direction signal switch is closed the pilot light is subjected to the voltage drop across the entire resistance R but when either stop light or back-up light are energized, the voltage on the pilot lamp is reduced since the drop is across one-half of the resistance only, but this is offset by the fact that twice the current is going through it.

I claim:

1. The combination of a hollow steering shaft, a steering wheel on the shaft having a hollow hub, a signal operating shaft enclosed within the hollow shaft and provided with an operating member at the upper end thereof, a signal, means actuated by the signal operating shaft for actuating the signal, and means housed within said hub for connecting the shafts to return the signal operating shaft to off position following its movement to on position through manipulation of the operating member.

2. The combination of a hollow steering shaft, a steering wheel on the shaft, a shaft enclosed within the hollow shaft and provided with an operating member, a switch connected to said shaft for operating a signal, means for yieldingly holding the switch in off position, and friction means between said shafts adapted to connect them and produce conjoint rotation thereof when said switch is in other than off position following its movement to on position through manipulation of the operating member.

3. The combination of a hollow steering shaft, a steering wheel on the shaft, a shaft inclosed within the hollow shaft and provided with an operating member at the upper end thereof having a hollow hub, a switch for operating a signal actuated by said second named shaft, a signal mounted in the hub of said operating member, and means for connecting said signal to said switch so as to be operated when the switch is closed.

4. The combination of a hollow steering shaft, a steering wheel on the shaft, a hollow shaft inclosed within the hollow steering shaft and provided with an operating member at the upper end thereof having a hollow hub, a switch for operating a signal actuated by said second named shaft, a shaft mounted within the second named hollow shaft provided with an operating member at the upper end thereof having a hollow hub, a horn button mounted within the last named hollow hub, said button being provided with an aperture, a lamp mounted in the hub so as to project light through the aperture and means for connecting said lamp in circuit with one of said switches so as to be lighted when said switch is closed.

5. The combination of a hollow steering shaft, a steering wheel on the shaft having a hollow hub, a switch operating shaft mounted for oscillation within the hollow steering shaft, an operating member on the switch operating shaft having a hollow hub located within the hub of the steering wheel, a switch operatively connected to the switch operating shaft, a signal mounted in the hollow hub of the operating member, and connections between the switch and signal for operating the signal upon movement of the switch operating shaft to on position.

6. The combination of a hollow steering shaft, a steering wheel on the shaft, a signal operating shaft mounted for oscillation within the hollow steering shaft, a signal, means actuated by the operating shaft for operating the signal, means for yieldingly holding the last named shaft in one position, and a friction clutch between said shafts adapted to connect them so that the signal operating shaft moves with the steering shaft when the signal operating shaft is out of said position.

7. In the combination as defined in claim 6, said steering shaft having a hollow hub and said friction clutch being located in said hub.

HARRY C. DOANE.